(12) United States Patent
Mogi

(10) Patent No.: US 6,597,290 B2
(45) Date of Patent: Jul. 22, 2003

(54) VALVE POSITION OUTPUT APPARATUS

(76) Inventor: Masanori Mogi, 1649-36, Umatate, Ichihara-shi, Chiba-ken 290-0221 (JP)

( * ) Notice: Subject to any disclaimer, the term of this patent is extended or adjusted under 35 U.S.C. 154(b) by 71 days.

(21) Appl. No.: 09/845,313

(22) Filed: May 1, 2001

(65) Prior Publication Data

US 2002/0044064 A1 Apr. 18, 2002

(30) Foreign Application Priority Data

May 1, 2000 (JP) ........................................ 2000-131986

(51) Int. Cl.$^7$ .............................................. G08B 21/00
(52) U.S. Cl. ................................. 340/686.1; 340/686.3
(58) Field of Search ............................. 340/605, 686.1, 340/686.3, 687, 606; 134/76, 102.1, 140; 251/129.05, 129.2, 230

(56) References Cited

U.S. PATENT DOCUMENTS 4,602,249 A * 7/1986 Abbott ..................... 340/605
4,688,758 A * 8/1987 Crosby, Jr. ................ 251/230
5,191,908 A * 3/1993 Hiroe et al. ................ 134/76

FOREIGN PATENT DOCUMENTS

| JP | 58-84283 | 5/1983 |
| JP | 61-228180 | 10/1986 |
| JP | 8-172357 | 7/1996 |
| JP | 9-6439 | 1/1997 |

* cited by examiner

*Primary Examiner*—Van Trieu
(74) *Attorney, Agent, or Firm*—Armstrong, Westerman & Hattori, LLP

(57) ABSTRACT

A valve-position output apparatus capable of adequately detecting valve-positions on an optical basis. The valve-position output apparatus for a valve comprises an interlocking member arranged to move in sync with open and close operations of the valve, a position detecting aperture formed in said interlocking member, an optical encoder having a light-emitting section and a light-receiving section which are arranged opposed to each other with interposing the interlocking member therebetween, digital valve-position signal generating means for generating a digital valve-position signal on the basis of a signal from the optical encoder, and initial setting means for initializing the digital valve-position signal generating means so as to match the digital valve-position signal of the digital valve-position signal generating means with an actual valve position.

2 Claims, 8 Drawing Sheets

VALVE POSITION OUTPUT APPARATUS

FIELD OF THE INVENTION

The present invention relates to a valve-position output apparatus for outputting positions of a valve.

BACKGROUND OF THE INVENTION

With reference to FIG. 8, a conventional valve-position output apparatus will be described. FIG. 8 is a schematic explanatory view of the conventional valve-position output apparatus, wherein FIG. 8(a) shows the state when a valve (not shown) is located at a fully closed valve-position and FIG. 8(b) shows the state when the valve is located at a fully opened valve-position. A pair of first and second arms 02, 03 are attached to a valve shaft 01 of the valve. The valve shaft 01 and the arms 02, 03 are arranged to rotate together in sync with open and close operations of the valve. At the fully closed valve-position shown in FIG. 8(a), the first arm 02 rotates a lever 07 of a limit switch unit 06 counterclockwise to turn on a first limit switch (not shown). On the other hand, at the fully opened valve-position shown in FIG. 8(b), the second arm 03 rotates the lever 07 of the limit switch unit 06 clockwise to turn on a second limit switch (not shown). As described above, the limit switch unit 06 includes the pair of opened valve-position and closed valve-position limit switches. Thus, it is necessary to provide three or four wirings for externally outputting signals from the limit switches.

In the case that a valve-position output apparatus is constructed in such a mechanical structure, it is difficult to sufficiently process data of the valve positions and in particular, to adequately conduct an initial setting in order to accurately detect the valve positions. Further, during open and close operations of the valve, the conflict between the arms 02, 03 and the lever 07 causes an undesirable noise and the wear of the arms 02, 03 and the lever 07. Furthermore, when the valve is moved between the fully opened valve-position and the fully closed valve-position which is spaced apart from the fully opened valve-position at an angle of about 90-degree, the conventional valve-position output apparatus may detect the fully opened and closed valve-positions, but may not detect any valve positions in a transition angle or intermediate angle where the valve is being moved between the fully opened and closed valve-positions.

SUMMARY OF THE INVENTION

In order to solve the aforementioned problems, it is an object of the present invention to provide a valve-position output apparatus capable of adequately detecting valve positions on an optical basis.

According to a first aspect of the present invention, there is provided a valve-position output apparatus comprising an interlocking member arranged to move in sync with the open and close operations of a valve, a position detecting aperture formed in the interlocking member, an optical encoder having a light-emitting section and a light-receiving section which are arranged opposed to each other with interposing the interlocking member therebetween, digital valve-position signal generating means for generating a digital valve-position signal on the basis of a signal from the optical encoder, and abnormality determining means for determining an abnormality to generate an alarm signal, by judging whether the valve is located in a transition angle defined between a fully opened valve-position and fully closed valve-position on the basis of the digital valve-position signal from the digital valve-position signal generating means and whether the time period in the transition angle exceeds a predetermined time. The abnormality determining means determines the abnormality when the valve is located in the transition angle for a period of time which exceeds the predetermined time.

In the first aspect of the present invention, the optical encoder is applied to the valve-position output apparatus. This provides reduced mechanical wear of parts and enhanced durability of the valve-position output apparatus. Further, noise arising from operations may be reduced and thereby undesirable noise of the valve-position output apparatus may be sufficiently reduced. Furthermore, contact points or the like may be reduced and thereby undesirable spark or the like may be prevented as least as possible. In addition, any valve positions including those in the transition angle defined between the fully opened and fully closed valve-positions may be readily detected. Since the encoder applied to the present invention is not a magnetic encoder, the valve-position output apparatus of the present invention may not be adversely affected by an external magnetic field and may not go against the external magnetic field.

The valve-position output apparatus of the first aspect of the present invention is also provided with the abnormality determining means. Thus, when the valve is stopped at the valve position in the transition angle, the alarm signal may be output.

According to a second aspect of the present invention, there is provided a valve-position output apparatus comprising an interlocking member adapted to move in sync with open and close operations of a valve, a position detecting aperture formed in the interlocking member, an optical encoder having a light-emitting section and a light-receiving section which are arranged opposed to each other with interposing the interlocking member therebetween, digital valve-position signal generating means for generating a digital valve-position signal on the basis of a signal of the optical encoder, and D/A converting means for converting the digital valve-position signal from the digital valve-position signal generating means into an analog signal. The D/A converting means is arranged to add a certain value to the digital valve-position signal so as not to make the analog signal have a zero value at a fully opened valve-position and fully closed valve-position.

In the second aspect of the present invention, the valve-position output apparatus is provided with the optical encoder. Thus, the effects yielded by the optical encoder are provided as with the valve-position output apparatus of the first aspect of the present invention. In addition, the valve-position output apparatus of the second aspect of the present invention includes the D/A converting means. This allows analog signals to be output despite of applying the optical encoder. Further, since the D/A converting means is arranged to add a certain value to the digital valve-position signal, the output analog signal does not become zero at the fully opened valve-position and fully closed valve-position in a normal state. Thus, when the output analog signal becomes zero, it may be judged as an abnormal state.

According to a third aspect of the present invention, there is provided a valve-position output apparatus comprising an interlocking member arranged to move in sync with open and close operations of a valve, a position detecting aperture formed in the interlocking member, an optical encoder having a light-emitting section and a light-receiving section which are arranged opposed to each other with interposing the interlocking member therebetween, digital valve-position signal generating means for generating a digital valve-position signal on the basis of a signal of the optical encoder, D/A converting means for converting the digital valve-position signal from the digital valve-position signal generating means into an analog signal, and ON-OFF signal generating means for generating ON and OFF signals. The ON-OFF signal generating means generates the ON signal at one of a fully opened valve-position and a fully closed valve-position and generates the OFF signal at the other of the fully opened valve-position and the fully closed valve-position.

In the third aspect of the present invention, the valve-position output apparatus is provided with the optical encoder. Thus, the effects yielded by the optical encoder are provided as with the valve-position output apparatus of the first aspect of the present invention. In addition, the valve-position output apparatus of the third aspect of the present invention includes the D/A converting means and the ON-OFF signal generating means. Thus, this valve-position output apparatus may output the digital valve-position signal, the analog signal and ON-OFF signal, and thereby may cope with various output forms by itself.

According to a fourth aspect of the present invention, there is provided a valve-position output apparatus for a valve arranged to stop at a fully opened valve-position and a fully closed valve-position which is spaced apart from the fully opened valve-position at an angle of about 90 degrees, and to move without any stop motion in a transition angle defined between the fully opened valve-position and the fully closed valve-position. This valve-position output apparatus comprises an interlocking member arranged to move in sync with open and close operations of the valve, a position detecting aperture formed in the interlocking member, an optical encoder having a light-emitting section and a light-receiving section which are arranged opposed to each other with interposing the interlocking member therebetween, digital valve-position signal generating means for generating a digital valve-position signal on the basis of a signal of the optical encoder, and ON-OFF signal generating means for generating ON and OFF signals. The ON-OFF signal generating means generates the ON signal at one of the fully opened valve-position and the fully closed valve-position and generates the OFF signal at the other of the fully opened valve-position and the fully closed valve-position. The valve-position output apparatus further comprises abnormality determining means for determining an abnormality to generate an alarm signal, by judging whether the valve is located in the transition angle defined between the fully opened valve-position and the fully closed valve-position on the basis of the digital valve-position signal from the digital valve-position signal generating means and whether the time period in the transition angle exceeds a predetermined time. The abnormality determining means determines the abnormality when the valve is located in the transition angle for a period of time which exceeds the predetermined time.

In the fourth aspect of the present invention, the valve-position output apparatus is provided with the optical encoder. Thus, the effects yielded by the optical encoder are provided as with the valve-position output apparatus of the first aspect of the present invention. In addition, the valve-position output apparatus of the fourth aspect of the present invention includes the ON-OFF signal generating means and the abnormality determining means. In the conventional valve-position output apparatus arranged to output either one of an ON signal and an OFF signal, when the ON signal or the OFF signal is output, the valve is not always located at the fully opened valve-position or fully closed valve-position, and there is the case that the valve is located at the valve position in the transition angle. However, in the valve-position output apparatus of the fourth aspect of the present invention, the alarm signal is output when the valve is located at the valve position in the transition angle for more than the predetermined time. Thus, when the ON signal or the OFF signal is output and the alarm signal is not output, it may be accurately judged that the valve is located at the fully opened valve-position or fully closed valve-position.

Other features and advantages of the present invention will be apparent from the accompanying drawings and from the detailed description.

BRIEF DESCRIPTION OF THE DRAWINGS

FIGS. 3(a)–3(d) are sectional views showing various types of valves, wherein

FIG. 3(a) shows a butterfly valve located at a fully closed valve-position,

FIG. 3(b) shows the butterfly valve located at a fully opened valve-position,

FIG. 3(c) shows a ball valve located at a fully closed valve-position, and

FIG. 3(d) shows the ball valve located at a fully opened valve-position;

FIGS. 4(a)–4(d) are explanatory views of an optical encoder, wherein

FIG. 4(a) is a front view of a rotary plate of an incremental encoder,

FIG. 4(b) is a sectional view taken along the line B—B of FIG. 4(a),

FIG. 4(c) is a front view of a rotary plate of an absolute encoder, and

FIG. 4(d) is a sectional view taken along the line D—D of FIG. 4(c),

FIGS. 5(a)–5(b) are explanatory views of a signal processing device of the optical encoder, wherein FIG. 5(a) is a schematic circuit diagram and FIG. 5(b) is a graph of an output of a D/A converter.

FIGS. 7(a)–7(b) are schematic explanatory views of a valve-position output apparatus according to a second embodiment of the present invention, wherein FIG. 7(a) is a sectional view and FIG. 7(b) is a partial view showing a substantial part of FIG. 7(a) viewed from the arrow B of FIG. 7(a).

FIGS. 8(a)–8(b) are schematic explanatory views of a conventional valve-position output apparatus, wherein FIG. 8(a) shows the state when a valve is located at a fully closed valve-position and FIG. 8(b) shows the state when the valve is located at a fully opened valve-position.

DESCRIPTION OF THE PREFERRED EMBODIMENT

With reference to FIGS. 1 to 7, embodiments of a valve-position output apparatus of the present invention will be described.

Figure 1:
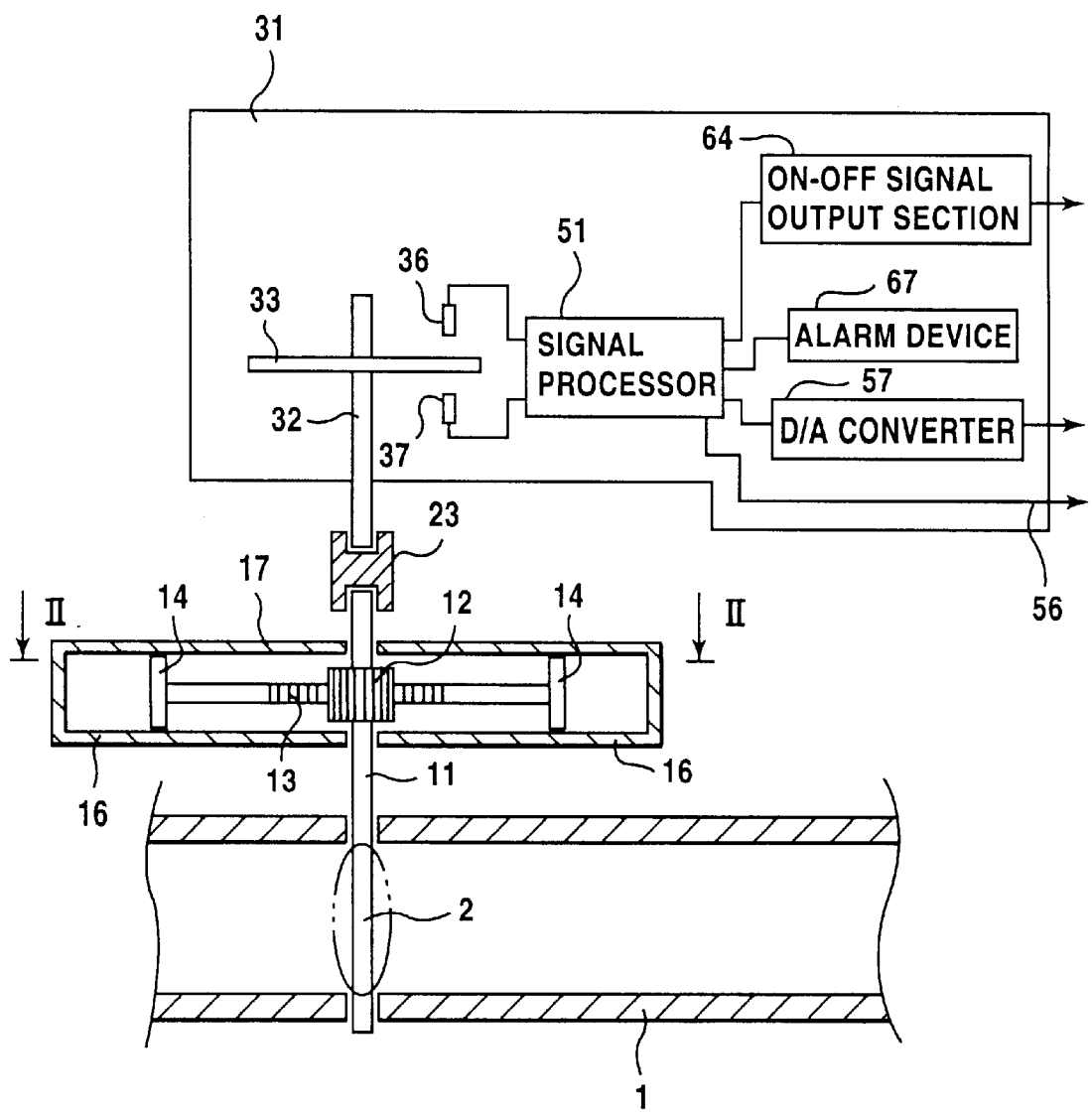
FIG. 1 is a schematic sectional view of a valve-position output apparatus according to a first embodiment of the present invention.
Figure 2:
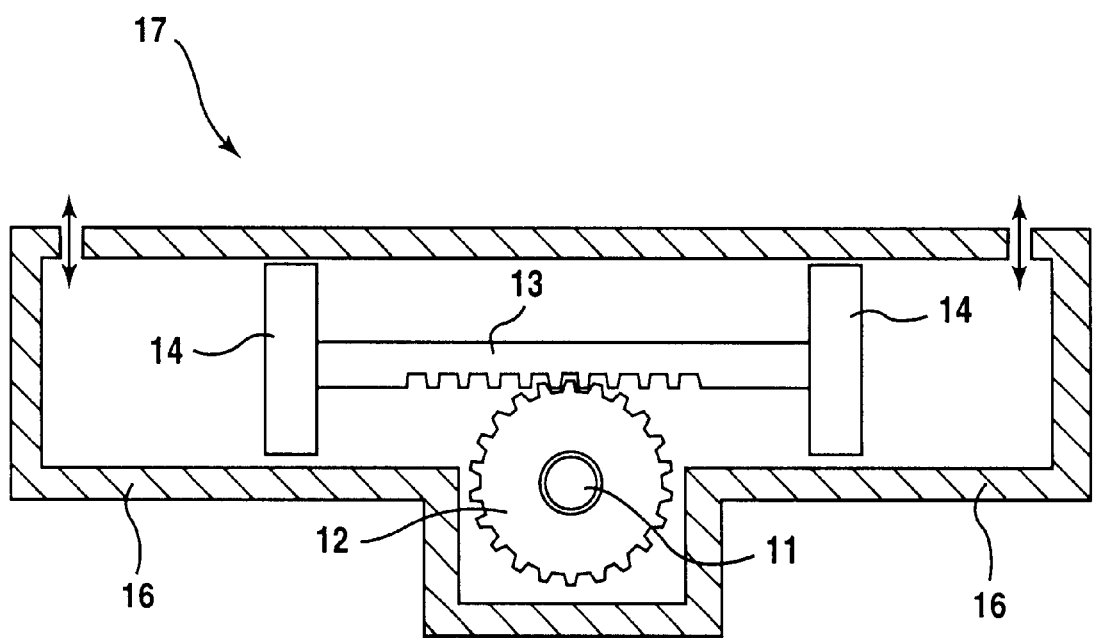
FIG. 2 is a sectional view taken along the line II of FIG. 1.

FIG. 1 is a schematic sectional view of a valve-position output apparatus according to a first embodiment of the present invention, and FIG. 2 is a sectional view taken along the line II of FIG. 1. As shown in these figures, in the first embodiment, a valve 2 is rotatably provided in a duct or pipe 1. This valve 2 is arranged to rotate between a fully opened valve-position and a fully closed valve-position which is spaced apart from the fully opened valve-position at an angle of about 90-degree. The valve 2 is typically used at either one of the fully opened and fully closed valve-positions. Specifically, the valve is not used at any valve position in a transition or intermediate angle between the fully opened and fully closed valve-positions, and is moved in succession or without any stop motion between the fully opened and fully closed valve-positions.

Figure 3A:
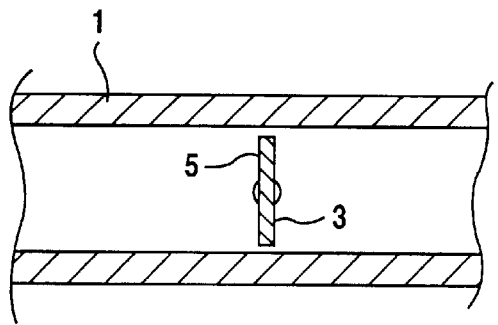
Figure 3B:
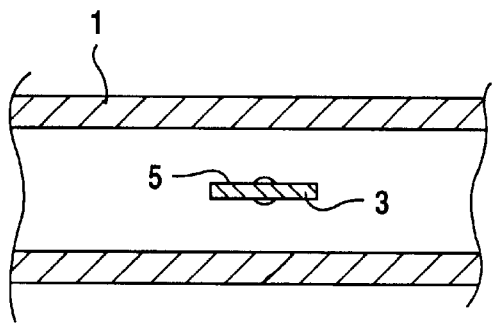
Figure 3C:
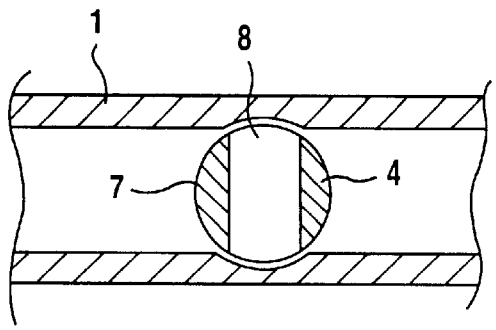
Figure 3D:
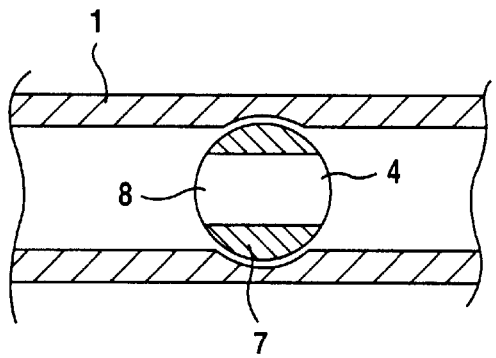

The valve 2 may include a butterfly valve 3 as shown in FIGS. 3(a) and 3(b), a ball valve 4 as shown in FIGS. 3(c) and 3(d) and the like. A valve body 5 of the butterfly valve 3 has a circular or disc shape. At the fully closed valve-position shown in FIG. 3(a), the valve body 5 is located approximately perpendicular to a flow direction of a fluid in the pipe 1 to block off the fluid. At the fully opened valve-position shown in FIG. 3(b), the valve body 5 is located approximately parallel to the flow direction of the fluid in the pipe 1 to allow the fluid to be flowed therethrough. On the other hand, a valve body 7 of the ball valve 4 has a spherical or globular shape and is formed with a through-hole 8 penetrating the valve body 7. At the fully closed valve-position shown in FIG. 3(c), the through-hole 8 is located approximately perpendicular to the flow direction of the fluid in the pipe 1 to block off the fluid. At the fully opened valve-position shown in FIG. 3(d), the through-hole 8 is located approximately parallel to the flow direction of the fluid in the pipe 1 to allow the fluid to be flowed therethrough.

As shown in FIG. 1, a valve shaft 11 of the valve 2 extends outside the pipe 1, and a pinion 12 (or a gear) is provided on the periphery of the extended section of the valve shaft 11. This pinion 12 is arranged to rotate with the valve shaft 11 in one united body, and to engage with a rack 13. Pistons 14 are provided at both ends of the rack 13, respectively. Each of the pistons 14 is placed in a corresponding pneumatic cylinder 16. Air is supplied to and discharged from each pneumatic cylinder 16 to drive the pistons 14, as shown in FIG. 2. When the pistons 14 are driven, the rack 13 is moved to rotate the pinion 12 and the valve shaft 11. The pinion 12, rack 13, pistons 14, pneumatic cylinders 16 and other make up a valve-driving device 17 for driving the valve 2. This valve-driving device 17 and the valve 2 make up a valve unit. An end of the valve shaft 11 is formed in a rectangular column, and protrudes from the valve unit. A suitable tool, such as a wrench, may be fitted in the end of the valve shaft 11 to manually rotate the valve 2. A valve-position output apparatus 31 for detecting a rotational position of the valve 2 and outputting a signal corresponding to the detected rotational position is attached to the end of the valve shaft 11. Specifically, an interlocking shaft 32 of the valve-position output apparatus 31 is coupled with the end of the valve shaft 11 through an adapter 23, such as a socket joint.

Figure 4A:
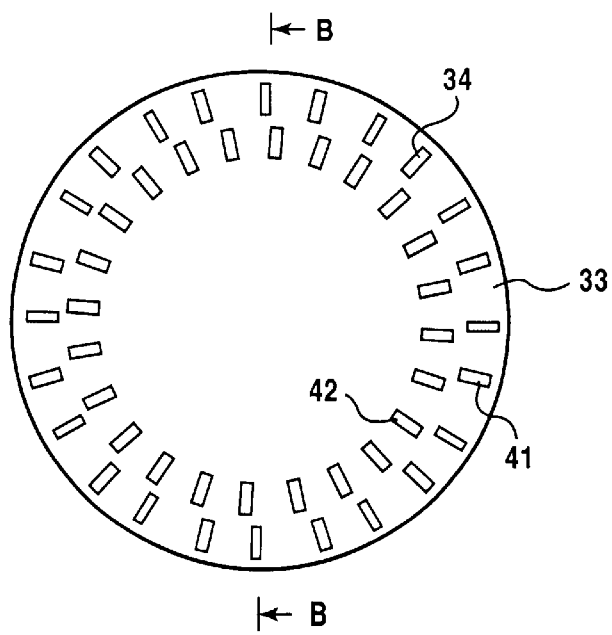
Figure 4B:
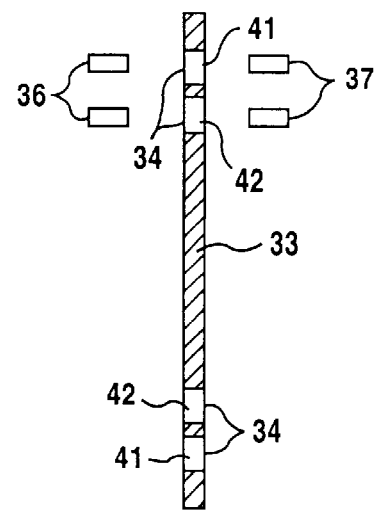
Figure 4C:
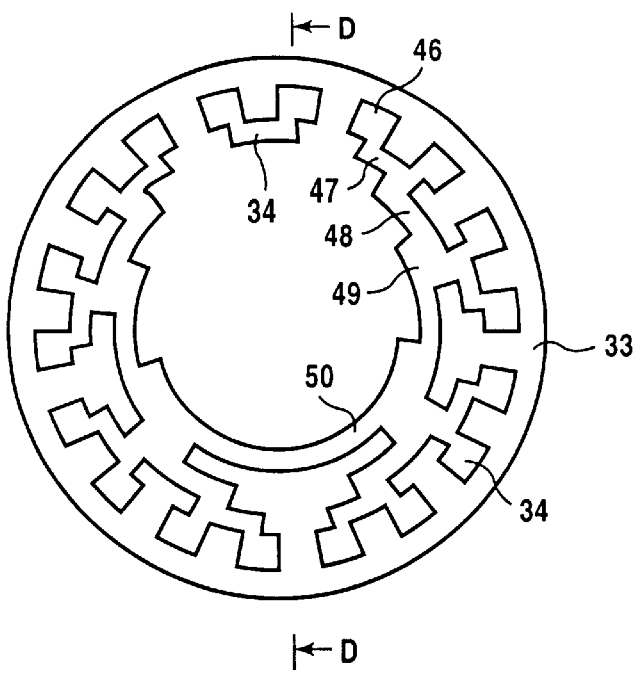
Figure 4D:
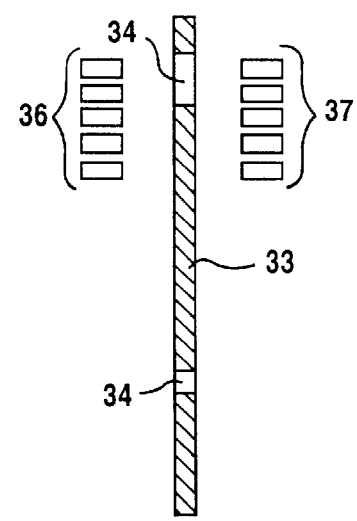

A circular rotary plate 33 is integrally provided in the interlocking shaft 32. This interlocking shaft 32 and the rotary plate 33 make up an interlocking member which is moved in sync with the rotation of the valve shaft 11 (or the open and close operations of the valve 2). As best shown in FIG. 4A, a plurality of position-detecting apertures 34 are formed in the rotary plate 33. Light-emitting diodes 36 serving as a light-emitting section and phototransistors 37 serving as a light-receiving section are located opposed to each other with interposing the rotary plate 33 therebetween. The interlocking shaft 32, rotary plate 33, position-detecting apertures 34, light-emitting diodes 36 and phototransistors 37 make up an optical rotary encoder. The phototransistors 37 are arranged to receive light from the corresponding light-emitting diodes 36 through the position-detecting apertures 34, and to generate a pulse signal in response to the rotation of the rotary plate 33. Thus, the rotational position of the rotary plate 33 may be figured out by processing the pulse signal. The optical encoder may include an incremental type encoder shown in FIGS. 4(a) and 4(b), and an absolute type encoder shown in FIGS. 4(c) and 4(d). In the incremental type encoder, the position-detecting apertures 34 include A-phase slits 41 and B-phase slits 42, and the phototransistors 37 are positioned to the slits 41, 42, respectively. Each phase of the B-phase slits 42 is shifted by one-quarter pitch with respect to each phase of the A-phase slits. This phase shift makes it possible to detect whether the rotary plate 33 rotates in a normal rotational direction or in a reverse rotational direction. In the incremental type encoder, the rotational position of the rotary plate 33 may be figured out by counting pulse signals from one of the phototransistors 37 (more specifically, by adding the counted pulse signals during the normal rotation and subtracting the counted pulse signals from the previous total pulse signals during the reverse rotation). On the other hand, in the absolute type encoder, the position-detecting apertures 34 comprise a plurality of tracks 46 to 50, and the phototransistors 37 are positioned to the tracks 46 to 50, respectively. Thus, the rotational position of the rotary plate 33 may be figured out by identifying one or more of the phototransistors 37 which are one or more of the detecting the tracks 46 to 50.

Figure 5A:
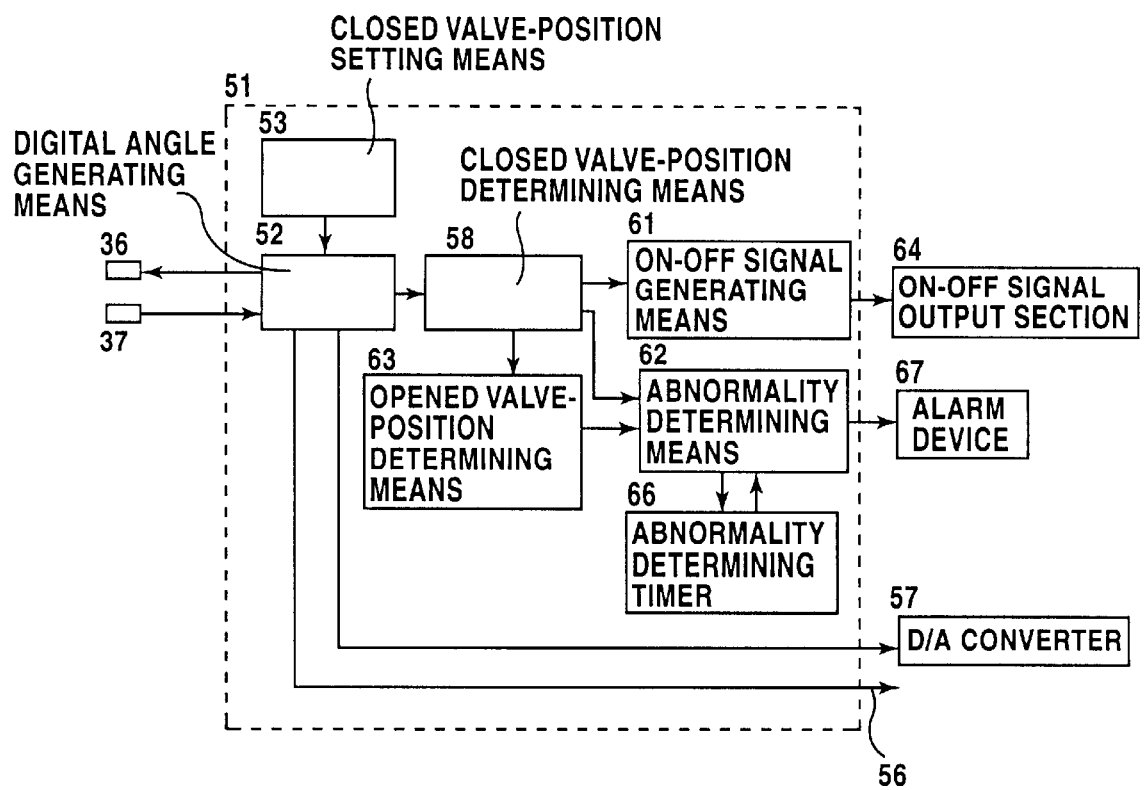
Figure 5B:
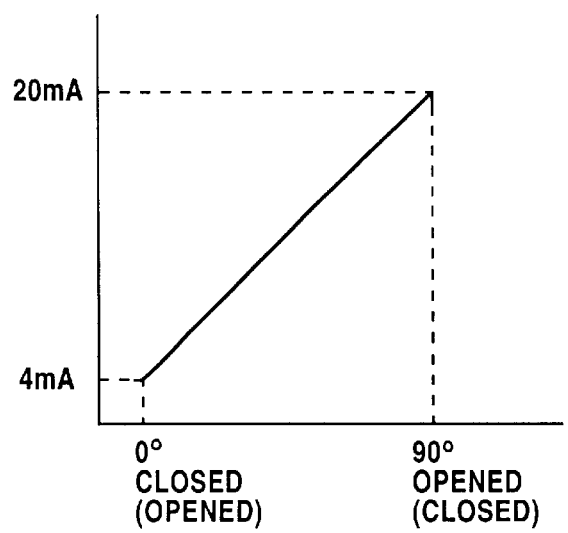

As shown in FIG. 5, in both types, the pulse signal from the phototransistors 37 is input to digital angle generating means 52 of a signal processor 51 composed of a microcomputer. The digital angle generating means 52 serving as digital valve-position signal generating means generates a digital signal corresponding to the rotational position of the rotary plate 33 on the basis of the pulse signal from the phototransistors 37. In the incremental type encoder, the digital angle generating means 52 is initialized by closed valve-position setting means 53 of the signal processor 51 with locating the valve 2 at the fully closed valve-position. The closed valve-position setting means 53 serving as initial setting means is composed of a button switch or the like. The digital angle generating means 52 is set in its origin by pushing the button switch. After the initial setting, when the valve 2 is opened or closed to rotate the rotary plate 33, the digital angle generating means 52 counts the pulse signal from the phototransistors 37, and outputs the counted number in the form of a digital angle signal (digital valve-position signal). In the incremental type encoder, the digital angle generating means 52 appropriately stores a current digital angle signal in a nonvolatile memory, such as EPROM. When a power supply is cut off and then turned on, the stored digitals angle signal is read out from the nonvolatile memory and used as the digital angle 20 signal at that time. On the other hand, in the absolute type encoder, the rotational position of the rotary plate 33 may be figured out by the signal from the phototransistors 37. However, the digital angle generating means 52 is initialized by the closed valve-position setting means 53 of the signal processor 51 with locating the valve 2 at the fully closed valve-position, because the valve 2 is not always located at the full closed valve-position with about zero degree. The digital angle generating means 52 is set in its origin by the closed valve-position setting means 53 and then generates the digital angle signal by subtracting an angel signal at the initial setting from the signal from the phototransistors 37.

The digital angle signal from the digital angle generating means 52 may be externally output directly from an external output terminal 56, or may otherwise be converted into an analog signal through a D/A converter 57 to externally output the converted analog signal. As shown in FIG. 5(*b*), when converting into the analog signal, the current value of the analog signal or an output analog signal is not set in zero mA but set in about 4 mA at the fully closed valve-position. Thus, the state when the output of the D/A converter 57 becomes about zero may be judged as abnormality, or that a certain failure arises in the valve-position output apparatus, etc.

The digital angle signal of the digital angle generating means 52 is output to the closed valve-position determining means 58. Then, the closed valve-position determining means 58 determines whether the valve 2 is located at the fully closed valve-position, on the basis of the digital angle signal. When determined that the valve 2 is locate at the fully closed valve-position, the closed valve-position determining means 58 outputs a closed valve-position signal to abnormality determining means 62 and an ON-OFF signal generator 61 serving as ON-OFF signal generating means. When determined that the valve 2 is not located at the fully closed valve-position, the closed valve-position determining means 58 outputs the digital angle signal received from the digital angle generating means 52 to opened valve-position determining means 63. In response to the closed valve-position signal from the closed valve-position determining means 58, the ON-OFF signal generator 61 externally outputs an ON signal (e.g. about 24 V) through an ON-OFF signal output section 64 being an amplifier composed of a transistor, etc. When receiving no closed valve-position signal from the closed valve-position determining means 58, the ON-OFF signal generator 61 externally outputs an OFF signal (e.g. about 0 V) through the ON-OFF signal output section 64. These ON and OFF signals are equivalent to a relay output of the conventional limit switch.

The opened valve-position determining means 63 determines whether the valve 2 is located it the fully opened valve-position, on the basis of the digital angle signal. When determined that the valve 2 is located at the fully opened valve-position, the opened valve-position determining means 63 outputs an opened valve-position signal to the abnormality determining means 62. In response to the closed valve-position signal from the closed valve-position determining means 58 or the opened valve-position signal from the opened valve-position determining means 63, the abnormality determining means 62 resets an abnormality determining timer 66. The abnormality determining timer 66 is arranged to output a lapsed time after the abnormality determining timer 66 is reset, to the abnormality determining means 62. The abnormality determining timer 66 has a specific abnormality determining time which is a predetermined reference time for determining the abnormality. When the lapsed time output from the abnormality determining timer 66 exceeds the abnormality determining time, the abnormality determining means 62 generates an alarm signal to an alarm device 67. The alarm device 67 gives an alarm with light, sound or the like in response to the alarm signal.

Figure 6:
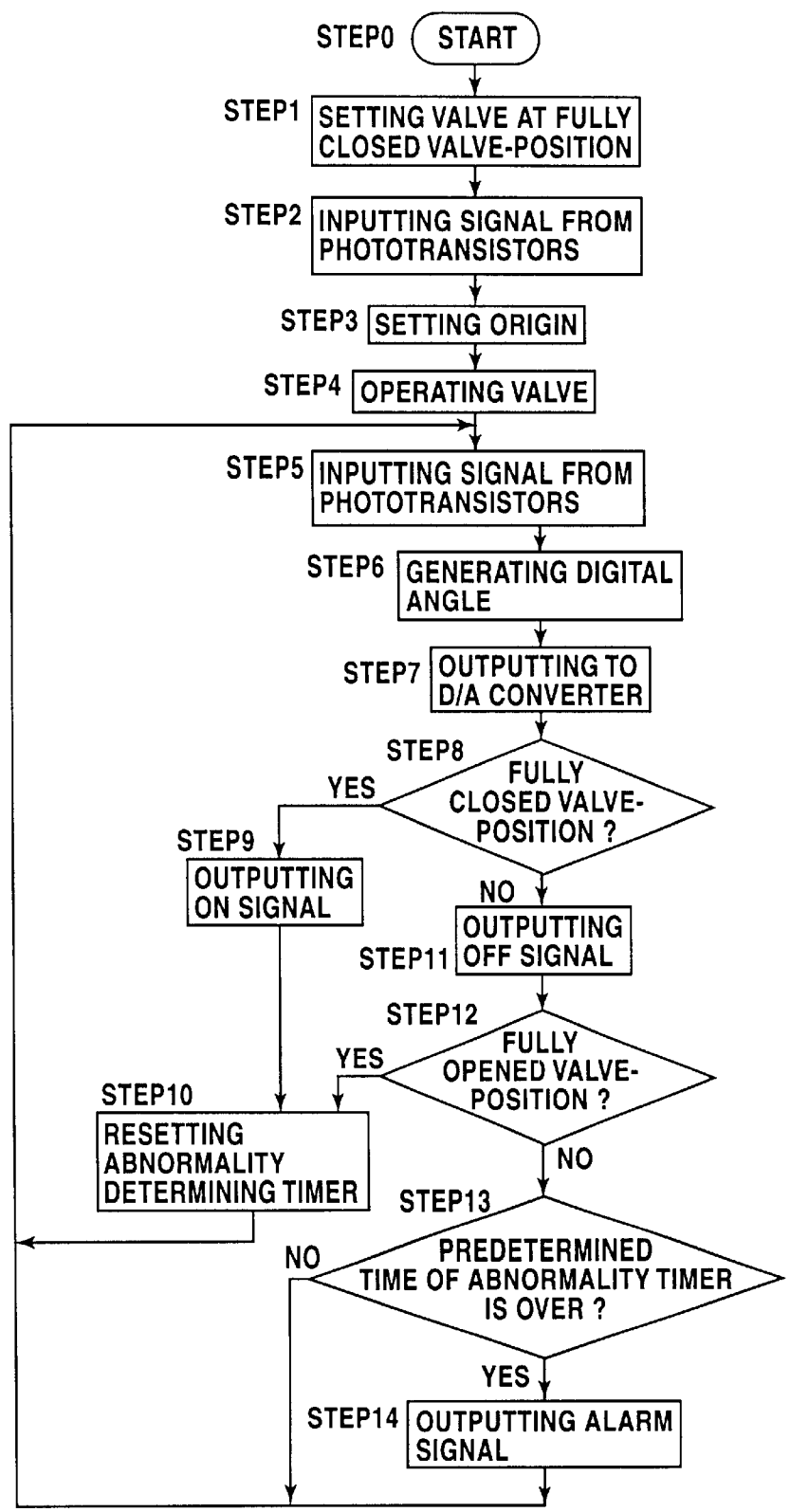
FIG. 6 is a flowchart of the operation of the valve-position output apparatus.

With reference to the flowchart of FIG. 6, the operation of the valve-position output apparatus 31 will be described.

In Step 1, for one of the initial setting after the valve-position output apparatus 31 is attached to the valve unit, the valve 2 is located at the fully closed valve-position being an original position of the valve 2. In Step 2, the light-emitting diodes 36 are activated to emit light, and the signal from the phototransistors 37 is input to the digital angle generating means 52 of the signal processor 51. In Step 3, the closed valve-position setting means 53 is operated by the button switch or the like as described above to set the origin of the digital angle generating means 52. The initial setting is completed through Steps 1 to 3.

In Step 4, compressed air is supplied to one of the pneumatic cylinders 16. Thus, the valve-driving device 17 is moved to rotate the valve 2, and then the process proceeds to Step 5. In Step 5, the light-emitting diodes 36 emit light, and the signal from the phototransistors 37 is input to the signal processor 51. Then, the process proceeds to Step 6. In Step 6, the digital angle generating means 52 generates the digital angle signal as a digital signal representing the rotational angle of the valve 2 on the basis of the signal from the optical rotary encoder or the light-emitting diodes 36 to externally output the digital angle signal from the external output terminal 56, and then the process proceeds to Step 7. In Step 7, the digital angle signal is output to the D/A converter 57 and is externally output from the D/A converter 57. Then, the process proceeds to Step 8. In Step 8, the closed valve-position determining means 58 determines whether the valve 2 is located at the fully closed valve-position, on the basis of the digital angle signal. When determined that the valve 2 is located at the fully closed valve-position, the process proceeds to Step 9. When determined that the valve 2 is not located at the fully closed valve-position, the process proceeds to Step 11.

In Step 9, the closed valve-position determining means 58 outputs the closed valve-position signal to the ON-OFF signal generator 61 and the abnormality determining means 62. In response to the closed valve-position signal, the ON-OFF signal generator 61 generates the ON signal, and the ON-OFF signal output section 64 amplifies the generated ON signal to externally output. In Step 10, the abnormality determining means 62 resets the abnormality determining timer 66 in response to the closed valve-position signal, and the process returns to Step 5.

As described above, when determined that the valve 2 is not located at the fully closed valve-position in Step 8, the process proceeds to Step 11. In Step 11, since no closed valve-position signal is input to the ON-OFF signal generator 61, the ON-OFF signal generator 61 generates the OFF signal to externally output it through the ON-OFF signal output section 64. The closed valve-position determining means 58 also outputs the digital angle signal to the opened valve-position determining means 63, and then the process proceeds to Step 12. In Step 12, the opened valve-position determining means 63 determines whether the valve 2 is located at the fully opened valve-position, on the basis of the digital angle signal from the closed valve-position determining means 58. When determined that the valve 2 is located at the fully opened valve-position, the opened valve-position determining means 63 outputs the opened valve-position signal to the abnormality determining means 62, and the process proceeds to Step 10. In response to the opened valve-position signal, the abnormality determining means 62 resets an abnormality determining timer 66, and then the process returns to Step 5.

On the other hand, when determined that the valve 2 is not located at the fully opened valve-position in Step 12, the process proceeds to Step 13. In step 13, the abnormality determining means 62 judges whether the lapsed time output from the abnormality determining timer 66 exceeds the predetermined abnormality determining time. When judged that the abnormality determining timer 66 does not exceed the predetermined abnormality determining time, the process returns to Step 5. When judged that the abnormality determining timer 66 does exceed the predetermined abnormality determining time, the process proceeds to Step 14. In Step 14, the abnormality determining means 62 generates the alarm signal to output it to the alarm device 67. In response to the alarm signal, the alarm device 67 gives the alarm, and then the process returns to Step 5.

The external output from the valve-position output apparatus constructed as described above may be applied to display the valve position or control the valve.

Figure 7A:
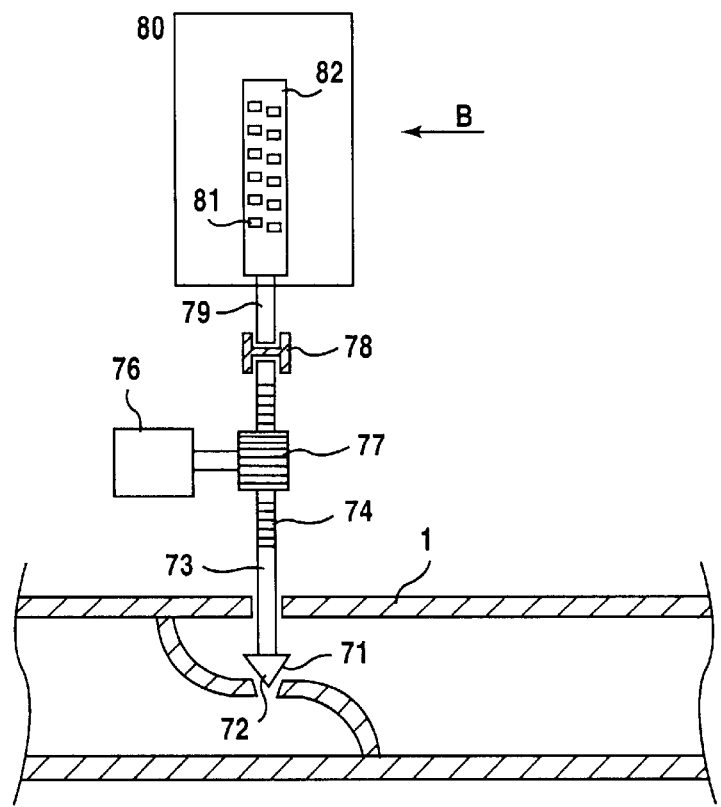
Figure 7B:
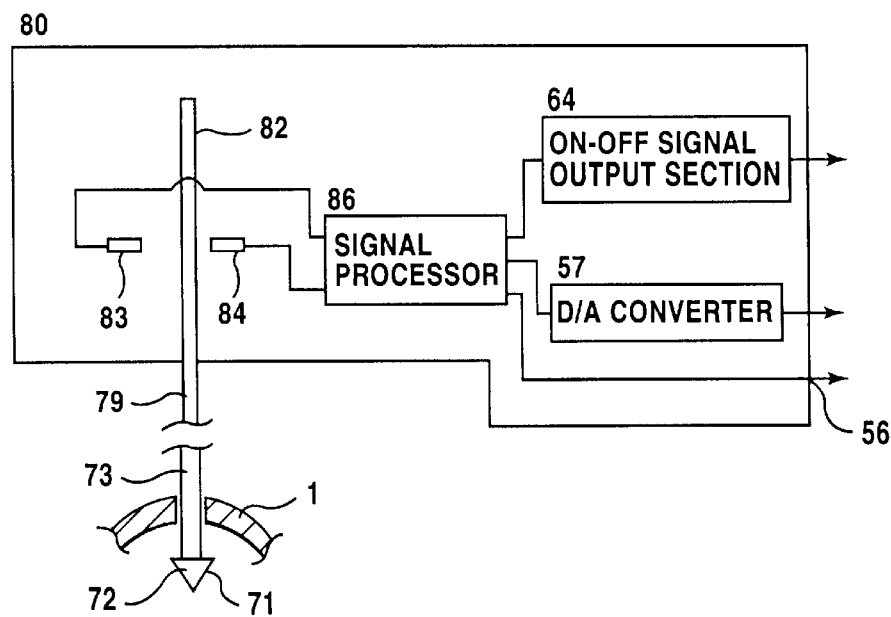
Figure 8A:
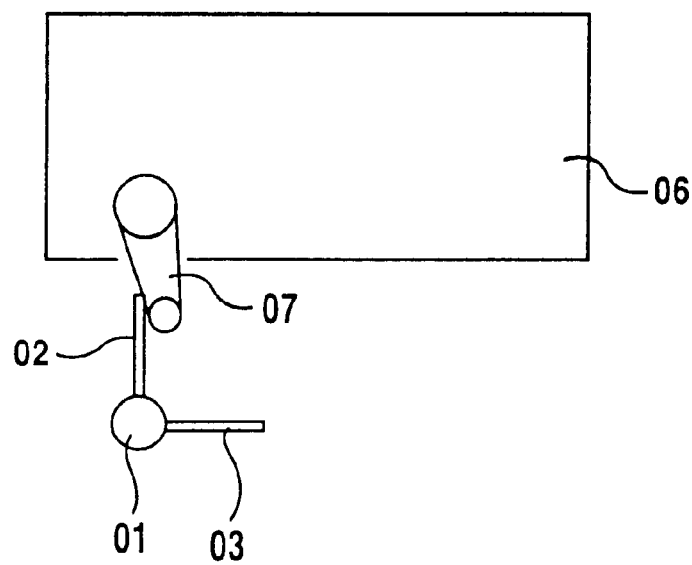
Figure 8B:
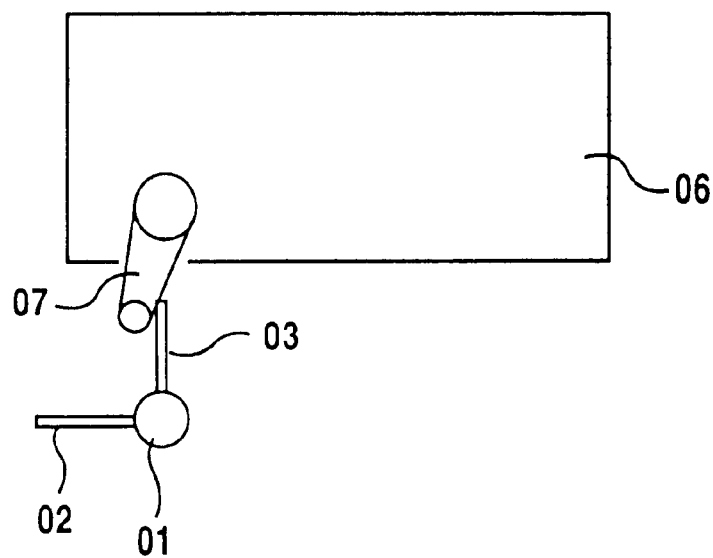

With reference to FIG. 7, a valve-position output apparatus according to a second embodiment of the present invention will be described.

In FIG. 7, a flow-regulating valve 71 is provided in a pipe 1. A valve body 72 of the flow-regulating valve 71 is linearly moved and is also reciprocated. The flow-regulating valve 71 is arranged to reciprocate between a fully closed valve-position where the flow-regulating valve 71 is almost fully closed (corresponding to the fully closed valve-position in the first embodiment) and a fully opened valve-position where the flow-regulating valve 71 is almost fully opened (corresponding to the fully opened valve-position in the first embodiment). The flow-regulating valve 71 is also arranged to stop at any position between the fully closed and fully opened valve-positions to regulate a flow rate of a fluid passing through the pipe 1. A rack 74 is formed in a valve shaft 73 of the flow-regulating valve 71, and a pinion 77 rotatably driven by a motor 76 is engaged with the rack 74. The rack 74, the motor 76 and the pinion 77 make up a valve-driving device. This valve-driving device and the flow-regulating valve 71 make up a valve unit. An interlocking shaft 79 of the valve-position output apparatus 80 is coupled with the end of the valve shaft 73 through an adapter 78. A plate member 82 having position-detecting apertures 81 is connected to the interlocking shaft 79. A light-emitting diode 83 and a phototransistor 84 are located opposed to each other with interposing the plate member 82 therebetween. The interlocking shaft 79 and the plate member 82 make up an interlocking member. The plate member 82, the light-emitting diodes 83 and the phototransistors 84 make up an optical linear encoder. As with the optical rotary encoder, the optical linear encoder may include the incremental type encoder and absolute type encoder. A signal processor 86 has a similar structure as that of the signal processor 51, but the valve-position output apparatus 80 does not include the alarm device 67.

The invention has now been described in detail with reference to specific embodiments. However, it is not intended that the invention is limited to such embodiments, and various modifications may be made within the spirit and scope of the appended claims. Some modifications of the present invention will be described as follows.

(1) The ON-OFF signal output section, the D/A converter and the external output terminal for digital signals may be selectively provided and are not necessarily provided all together. In particular, in case of providing only either one of the D/A converter or the external output terminal for digital signals, wirings may be reduced as less as possible. The ON-OFF signal output section may be configured by a relay or the like.

(2) The structure or type of the valve and the optical encoder may be appropriately modified and selected.

(3) While the driving power of the valve-driving device is an air pressure in the above embodiments, any other type of driving power, such as electrical or hydraulic power, may be applied. The structure or type of the valve-driving device may also be appropriately modified and selected.

(4) The alarm device may be omitted. Further, the alarm signal may be externally output.

(5) While the origin is defined at the fully closed valve-position in the above embodiments, the fully opened valve-position may be used as the origin.

(6) While the analog signal is arranged to add a certain value to the output analog signal when converting the digital signal to the analog signal in the above embodiments, it is possible not to add such an additional value. However, it is preferable to add such an additional value for detecting the abnormality.

(7) While the ON-OFF signal generator and the ON-OFF signal output section are provided only to the fully closed valve-position in the above embodiments, they may also be provided to the fully opened valve-position.

(8) While the power source of the valve-position output apparatus is supplied from outside in the above embodiments, an internal power source, such as a battery, may be provided in the valve-position output apparatus, and an backup power source may be additionally provided.

(9) While the valve shaft is formed of a single member in the above embodiments, it may be constructed by a plurality of members.

(10) The ON-OFF signal may be switched to output the ON signal when the valve is moved to one of the fully opened and fully closed valve-positions, and to output the OFF signal when the valve is moved to the other of the fully opened and fully closed valve-positions.

(11) The digital signal may be output through an RS232C connector or any suitable connector, such as an RS 485 connector.

What is claimed is:

1. A valve-position output apparatus comprising:

an interlocking member arranged to move in sync with open and close operations of a valve;

a position detecting aperture formed in said interlocking member;

an optical encoder having a light-emitting section and a light-receiving section which are arranged opposed to each other with interposing said interlocking member therebetween;

digital valve-position signal generating means for generating a digital valve-position signal on the basis of a signal from said optical encoder; and abnormality determining means for determining an abnormality to generate an alarm signal, by judging whether said valve is located in a transition angle defined between a fully opened valve-position and fully closed valve-position on the basis of said digital valve-position signal from said digital valve-position signal generating means and whether the time period in said transition angle exceeds a predetermined time, wherein said abnormality determining means determines said abnormality when said valve is located in said transition angle and said time period in said transition angle exceeds said predetermined time.

2. A valve-position output apparatus for a valve arranged to stop at a fully opened valve-position and a fully closed valve-position which is spaced apart from said fully opened valve-position at an angle of about 90 degree, and to move without stopping in a transition angle defined between said fully opened valve-position and said fully closed valve-position, said valve-position output apparatus comprising:

- an interlocking member arranged to move in sync with open and close operations of said valve;
- a position detecting aperture formed in said interlocking member;
- an optical encoder having a light-emitting section and a light-receiving section which are arranged opposed to each other with interposing said interlocking member therebetween;
- digital valve-position signal generating means for generating a digital valve-position signal on the basis of a signal of said optical encoder;
- ON-OFF signal generating means for generating ON and OFF signals, wherein said ON-OFF signal generating means generates said ON signal at one of said fully opened valve-position and said fully closed valve-position and generates said OFF signal at the other of said fully opened valve-position and said fully closed valve-position; and
- abnormality determining means for determining an abnormality to generate an alarm signal, by judging whether said valve is located in said transition angle defined between said fully opened valve-position and said fully closed valve-position on the basis of said digital valve-position signal from said digital valve-position signal generating means and whether the time period in said transition angle exceeds a predetermined time, wherein said abnormality determining means determines said abnormality when said valve is located in said transition angle and said time period in said transition angle exceeds said predetermined time.

* * * * *